US012810853B2

(12) United States Patent
Li et al.

(10) Patent No.: US 12,810,853 B2
(45) Date of Patent: Nov. 24, 2026

(54) VOICE INTERACTION SYSTEM, VOICE INTERACTION METHOD AND SMART DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Gang Li, Beijing (CN); Fei Dong, Beijing (CN); Tanhong Zhao, Beijing (CN); Guojian Qu, Beijing (CN); Yawei Chen, Beijing (CN); Yangyang Cai, Beijing (CN); Xilei Tian, Beijing (CN); Qiaoke Zhou, Beijing (CN); Jing Wang, Beijing (CN); Xiang Li, Beijing (CN); Bochang Wang, Beijing (CN); Shaoming Yan, Beijing (CN); Wei Yuan, Beijing (CN)

(73) Assignees: BEIJING BOE DISPLAY TECHNOLOGY CO., LTD., Beijing (CN); Beijing BOE Technology Development Co., Ltd., Beijing (CN)

( * ) Notice: Subject to any disclaimer, the term of this patent is extended or adjusted under 35 U.S.C. 154(b) by 613 days.

(21) Appl. No.: 18/246,746

(22) PCT Filed: Apr. 2, 2022

(86) PCT No.: PCT/CN2022/085051
§ 371 (c)(1),
(2) Date: Mar. 27, 2023

(87) PCT Pub. No.: WO2023/184535
PCT Pub. Date: Oct. 5, 2023

(65) Prior Publication Data
US 2024/0363108 A1 Oct. 31, 2024

(51) Int. Cl.
*G10L 15/22* (2006.01)
*G06F 3/01* (2006.01)

(52) U.S. Cl.
CPC .............. *G10L 15/22* (2013.01); *G06F 3/017* (2013.01)

(58) Field of Classification Search
None
See application file for complete search history.

(56) References Cited

U.S. PATENT DOCUMENTS

2010/0187023 A1* 7/2010 Min .......................... H04M 1/22 178/18.09
2011/0215952 A1* 9/2011 Aria .......................... G06F 3/017 341/20
(Continued)

FOREIGN PATENT DOCUMENTS

CN 106826838 A 6/2017
CN 108509619 A 9/2018
(Continued)

*Primary Examiner* — Jonathan C Kim
(74) *Attorney, Agent, or Firm* — WHDA, LLP

(57) ABSTRACT

The present disclosure provides a voice interaction system, a voice interaction method, and a smart device. The system includes: a voice interaction unit, a photoelectric sensing unit, and an instruction control unit configured to determine whether the voice interaction unit is in an on state, determine, when the voice interaction unit is in the on state, whether the voice interaction unit receives a target voice instruction within a predetermined time; control, when the target voice instruction is received within the predetermined time, a smart device to perform an action corresponding to the target voice instruction according to the target voice instruction of the user received and identified by the voice interaction unit; and send, when the voice instruction is not received within the predetermined time, a standby instruction to the voice interaction unit.

16 Claims, 4 Drawing Sheets

(56) References Cited

U.S. PATENT DOCUMENTS

| | | | | |
|---|---|---|---|---|
| 2014/0379341 | A1* | 12/2014 | Seo | G06F 1/163<br>704/246 |
| 2015/0100322 | A1* | 4/2015 | Lee | H04N 21/42204<br>704/275 |
| 2016/0248899 | A1* | 8/2016 | Lee | H04M 1/724 |
| 2017/0025122 | A1* | 1/2017 | Choi | H04M 1/72454 |
| 2017/0116987 | A1* | 4/2017 | Kang | G10L 15/26 |
| 2017/0186446 | A1* | 6/2017 | Wosk | G06F 3/167 |
| 2017/0364763 | A1* | 12/2017 | Jin | G06F 3/0412 |
| 2019/0339784 | A1* | 11/2019 | Lemay | G06F 1/3206 |
| 2019/0353910 | A1* | 11/2019 | Gwalani | G02B 27/0172 |
| 2023/0321557 | A1* | 10/2023 | Cho | A63H 33/086<br>439/74 |
| 2024/0363108 | A1* | 10/2024 | Li | G06F 3/167 |

FOREIGN PATENT DOCUMENTS

| | | | |
|---|---|---|---|
| CN | 109754801 | A | 5/2019 |
| CN | 113192509 | A | 7/2021 |
| CN | 214544552 | U | 10/2021 |
| JP | 2004-198581 | A | 7/2004 |

* cited by examiner

VOICE INTERACTION SYSTEM, VOICE INTERACTION METHOD AND SMART DEVICE

CROSS-REFERENCE TO RELATED APPLICATION

This application is the U.S. national phase of PCT Application No. PCT/CN2022/085051 filed on Apr. 2, 2022, which is incorporated by reference herein in its entirety.

TECHNICAL FIELD

The present disclosure relates to the field of smart device technology, in particular to a voice interaction system, a voice interaction method and a smart device.

BACKGROUND

The Internet of Things has become an important driving force for a new round of global technological revolution and industrial transformation. The voice recognition technology is a technology with rich application scenarios in the Internet of Things, and the microphone, as a signal acquisition device for voice recognition technology, affects the ability of voice recognition.

SUMMARY

The present disclosure provides in some embodiments a voice interaction system, a voice interaction method and a smart device, so as to turn on an intelligent voice speaker through limb sensing, thereby to interact with the entire smart device, effectively prevent valid voice instructions from being missed and improve an intelligent level of the voice interaction system.

The technical solutions in the embodiments of the present disclosure are as follows.

The present disclosure provides in some embodiments a voice interaction system, which includes: a voice interaction unit, configured to collect and identify a target voice instruction of a user; a photoelectric sensing unit, where the photoelectric sensing unit is connected to the voice interaction unit, and configured to receive and identify a target limb instruction of the user, and control the voice interaction unit to be turned on or off in accordance with the target limb instruction; and an instruction control unit, where the instruction control unit is connected to the voice interaction unit, and configured to determine whether the voice interaction unit is in an on state, determine, in a case that the voice interaction unit is in the on state, whether the voice interaction unit receives a target voice instruction within a predetermined time, control, in a case that the target voice instruction is received within the predetermined time, a smart device to perform an action corresponding to the target voice instruction in accordance with the target voice instruction of the user received and identified by the voice interaction unit, and send, in a case that the voice instruction is not received within the predetermined time, a standby instruction to the voice interaction unit.

In a possible embodiment of the present disclosure, the instruction control unit is further configured to identify whether the voice interaction unit receives the voice instruction within a predetermined standby time, and send, in a case that the voice instruction is not received within the predetermined standby time, a first turn-off instruction to the voice interaction unit.

In a possible embodiment of the present disclosure, the photoelectric sensing unit includes a photoelectric sensor, and the photoelectric sensor is a laser distance sensor.

In a possible embodiment of the present disclosure, the laser distance sensor has a sensing distance of 80 mm to 150 mm.

In a possible embodiment of the present disclosure, one or more indicators are provided on the photoelectric sensing unit, and the indicators include a first color indicator and a second color indicator. The voice interaction unit is further configured to send, in a case that a first turn-off instruction is received, a second turn-off instruction to the photoelectric sensing unit. The photoelectric sensing unit is further configured to energize the first color indicator in a case that the second turn-off instruction or a turn-off operation from the user is received, and energize the second color indicator in a case that a first turn-on instruction or a turn-on operation from the user is received.

In a possible embodiment of the present disclosure, the photoelectric sensing unit includes: a housing, where an interior of the housing is hollowed-out, the housing includes a front end and a rear end, an indication mark is provided on an end surface of the front end, and an opening is provided at the rear end, a photoelectric sensor arranged in the housing, a circuit board arranged in the housing, where a switch circuit is arranged on the circuit board and connected to the photoelectric sensor, an indicator arranged in the housing, a rear cover fastened onto the rear end of the housing, and a signal transmission harness, where one end of the signal transmission harness is connected to the circuit board, and the other end of the signal transmission harness extends out of the rear cover.

In a possible embodiment of the present disclosure, the indication mark includes an incised hollowed-out mark, and the end surface of the front end apart from the incised hollowed-out mark is a black silk-screen printing region, and the black silk-screen printing region has a blank region at a periphery of the end surface of the front end.

In a possible embodiment of the present disclosure, the housing is a transparent injection-molding housing made of a mixed material of an injection-molding material with a light transmittance greater than a predetermined threshold and a masterbatch.

In a possible embodiment of the present disclosure, the injection-molding material is an acrylonitrile-butadiene-styrene plastic.

In a possible embodiment of the present disclosure, a light-guide strip is arranged on an inner side of the housing and at a periphery of the end surface of the front end.

In a possible embodiment of the present disclosure, the indicators include at least two first color indicators and at least two second color indicators, the at least two first color indicators are respectively located on opposite sides of the end surface of the front end, and the at least two second color indicators are respectively located on the opposite sides of the end surface of the front end.

In a possible embodiment of the present disclosure, the voice interaction system further includes an image acquisition unit, the instruction control unit is connected to the image acquisition unit, and configured to receive and identify image data collected by the image acquisition unit, and send, in a case that the image data includes a target gesture, a first turn-on instruction to the voice interaction unit. The voice interaction unit is further configured to send, in a case that the first turn-on instruction is received, a second turn-on instruction to the photoelectric sensing unit.

In a possible embodiment of the present disclosure, the voice interaction unit is communicated with the instruction control unit through serial port instructions, and the voice interaction unit is communicated with the instruction control unit through serial port instructions.

In a possible embodiment of the present disclosure, a first through hole and a second through hole are arranged in the front end, a receiving electrode and an emitting electrode are arranged on the photoelectric sensor, the receiving electrode is located at the first through hole, and the emitting electrode is located at the second through hole.

The present disclosure further provides in some embodiments a voice interaction method for the above-mentioned voice interaction system. The method includes: determining whether the voice interaction unit is in the on state; determining, in a case that the voice interaction unit is in the on state, whether the voice interaction unit receives the target voice instruction within the predetermined time, controlling, in a case that the target voice instruction is received within the predetermined time, the smart device to perform the action corresponding to the target voice instruction in accordance with the target voice instruction of the user received and identified by the voice interaction unit, and sending, in a case that the voice instruction is not received within the predetermined time, the standby instruction to the voice interaction unit; and controlling, in a case that the voice interaction unit is not in the on state, in accordance with the target limb instruction of the user received and identified by the photoelectric sensing unit, the voice interaction unit to be turned on, and controlling, in accordance with the target voice instruction of the user received and identified by the voice interaction unit, the smart device to perform the action corresponding to the target voice instruction.

In a possible embodiment of the present disclosure, the method further includes: determining, in a case that the voice interaction unit is in the on state, whether the voice interaction unit receives the voice instruction within a predetermined standby time: controlling, in a case that the voice interaction unit is not received within the predetermined standby time, the voice interaction unit to be turned off.

In a possible embodiment of the present disclosure, the method further includes: determining, in a case that the voice interaction unit is in the on state, whether the voice interaction unit receives the voice instruction within the predetermined time; controlling, in a case that the voice interaction unit is not received within the predetermined time, the photoelectric sensing unit to be turned off.

In a possible embodiment of the present disclosure, the method further includes: energizing a first color indicator in a case that the photoelectric sensing unit receives a second turn-off instruction or a turn-off operation from the user, and energizing a second color indicator in a case that a first turn-on instruction or a turn-on operation from the user is received.

In a possible embodiment of the present disclosure, the method further includes: receiving and identifying image data collected by an image acquisition unit, and controlling, in a case that the image data includes a target gesture, the photoelectric sensing unit and the voice interaction unit to be turned on.

The present disclosure further provides in some embodiments a smart device including the above-mentioned voice interaction system.

The embodiments of the present disclosure have the following beneficial effects.

In the voice interaction system, the voice interaction method and the smart device of the embodiments of the present disclosure, the voice interaction unit is combined with the photoelectric sensing unit, the voice interaction unit may collect and identify the target voice instruction of the user, the photoelectric sensing unit may receive and identify the target limb instruction of the user, so as to control the voice interaction unit to be turned on or off, and the instruction control unit determines whether the voice interaction unit is turned on. In a case that the voice interaction unit is turned on, the smart device may be controlled to perform the corresponding action in accordance with the target voice instruction, so as to control the voice interaction unit to be turned on or off through a limb action, thereby to achieve an interaction with the entire machine, and solve the technical problem of how the photoelectric sensing unit controls the voice interaction unit to be turned on and the instruction control unit controls the voice interaction unit and the photoelectric sensing unit to be turned on or off. Moreover, the instruction control unit may further control the voice interaction unit to stand by when determining that the voice interaction unit does not receive the voice instruction within the predetermined time, instead of directly controlling the voice interaction unit to be turned off immediately, so as to prevent a valid voice instruction from being missed that may be caused by the immediate shutdown of the voice interaction unit in a case that a voice is not received from the user or a voice recognition error occurs within a short period of time, thereby improving the intelligent level of voice interaction.

DETAILED DESCRIPTION

In order to make the objects, the technical solutions and the advantages of the present disclosure more apparent, the present disclosure will be described hereinafter in a clear and complete manner in conjunction with the drawings and embodiments. Apparently, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "include" or "including" intends to indicate that an element or object before the word contains an element or object or equivalents thereof listed after the word, without excluding any other element or object. Such words as "connect/connected to" or "couple/coupled to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

The present disclosure provides in some embodiments a voice interaction system, which may be applied to various smart devices, e.g., smart refrigerators, smart washing machines, smart TVs and the like.

Figure 1:
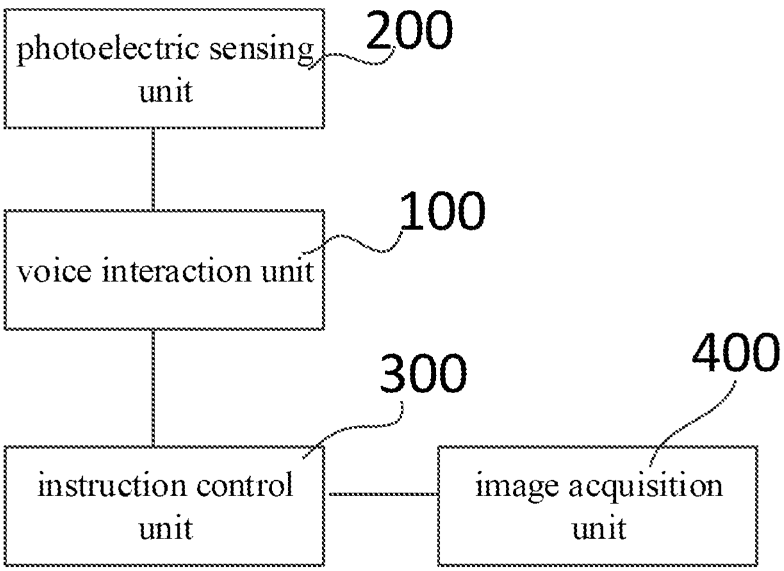
FIG. 1 is a structural block diagram of a voice interaction system according to one embodiment of the present disclosure.
Figure 2:
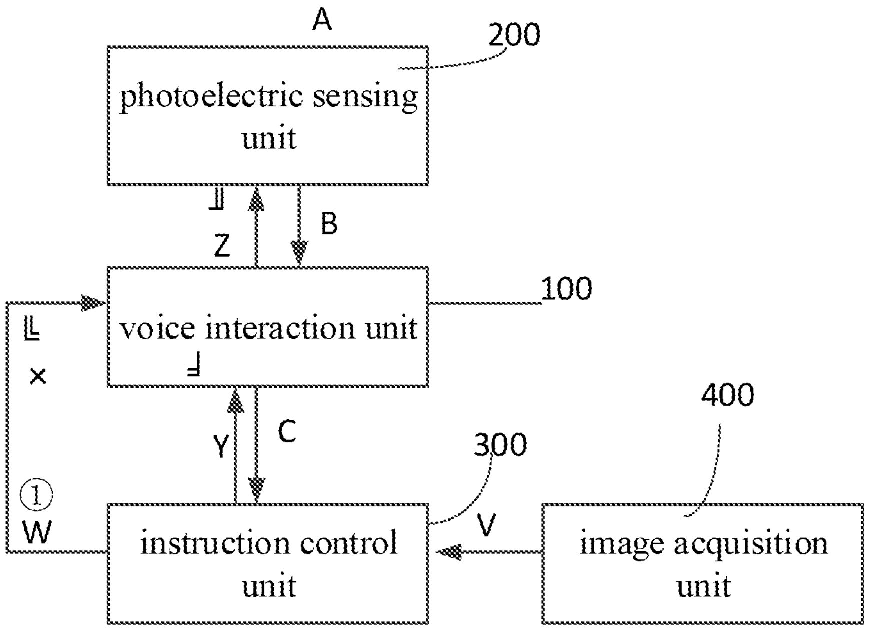
FIG. 2 is a logical block diagram of the voice interaction system according to one embodiment of the present disclosure.

FIG. 1 is a structural block diagram of a voice interaction system according to one embodiment of the present disclosure, and FIG. 2 is a logical block diagram of the voice interaction system according to one embodiment of the present disclosure.

Referring to FIG. 1 and FIG. 2, the voice interaction system of the smart device includes: a voice interaction unit 100, configured to collect and identify a target voice instruction of a user: a photoelectric sensing unit 200, where the photoelectric sensing unit 200 is connected to the voice interaction unit 100, and configured to receive and identify a target limb instruction of the user, and control the voice interaction unit 100 to be turned on or off in accordance with the target limb instruction; and an instruction control unit 300, where the instruction control unit 300 is connected to the voice interaction unit 100, and configured to determine whether the voice interaction unit 100 is in an on state, determine, in a case that the voice interaction unit is in the on state, whether the voice interaction unit 100 receives a target voice instruction within a predetermined time, control, in a case that the target voice instruction is received within the predetermined time, a smart device to perform an action corresponding to the target voice instruction in accordance with the target voice instruction of the user received and identified by the voice interaction unit 100, and send, in a case that the voice instruction is not received within the predetermined time, a standby instruction to the voice interaction unit 100.

In the above-mentioned solution, the voice interaction unit 100 is combined with the photoelectric sensing unit 200, the voice interaction unit 100 may collect and identify the target voice instruction of the user, the photoelectric sensing unit 200 may receive and identify the target limb instruction of the user, so as to control the voice interaction unit 100 to be turned on or off, and the instruction control unit 300 determines whether the voice interaction unit 100 is turned on. In a case that the voice interaction unit 100 is turned on, the smart device may be controlled to perform the corresponding action in accordance with the target voice instruction, so as to control the voice interaction unit 100 to be turned on or off through a limb action, thereby to achieve an interaction with the entire machine, and solve the technical problem of how the photoelectric sensing unit 200 controls the voice interaction unit 100 to be turned on and the instruction control unit 300 controls the voice interaction unit 100 and the photoelectric sensing unit 200 to be turned on or off. Moreover, the instruction control unit 300 may further control the voice interaction unit 100 to stand by when determining that the voice interaction unit 100 does not receive the voice instruction within the predetermined time, instead of directly controlling the voice interaction unit 100 to be turned off immediately, so as to prevent a valid voice instruction from being missed that may be caused by the immediate shutdown of the voice interaction unit 100 in a case that a voice is not received from the user or a voice recognition error occurs within a short period of time, thereby improving the intelligent level of voice interaction.

In some embodiments of the present disclosure, the instruction control unit 300 is further configured to identify whether the voice interaction unit 100 receives a voice instruction within a predetermined standby time, and send, in a case that the voice instruction is not received within the predetermined standby time, a first turn-off instruction to the voice interaction unit 100. Based on the above-mentioned scheme, the standby time may be set, such as, 30s, and the voice interaction unit 100 is turned off when the valid voice instruction is not recognized during the standby time. In this way, while saving energy consumption, the voice interaction unit 100 is not turned off immediately without receiving a voice instruction within a short period of time, thereby preventing the collection of valid voice from being missed. For example, there is a pause in the middle of a process where the user sends a voice instruction, in a case where the voice interaction unit 100 is turned off immediately, the collection of valid voice is missed. Moreover, the voice interaction unit 100 is turned off in a case that no voice instruction is recognized during the predetermined standby time, it is able to not only effectively avoid the collection of such sound as non-voice instructions, but also protect user privacy.

In addition, in some embodiments of the present disclosure, one or more indicators are provided on the photoelectric sensing unit 200, and the indicators may include a first color indicator 410 and a second color indicator 420. The voice interaction unit 100 is further configured to send, in a case that a first turn-off instruction is received, a second turn-off instruction to the photoelectric sensing unit 200. The photoelectric sensing unit 200 is further configured to energize the first color indicator 410, and deenergize the second color indicator 420 in a case that the second turn-off instruction or a turn-off operation from the user is received, and energize the second color indicator 420, and deenergize the first color indicator 410 in a case that a first turn-on instruction sent by the voice interaction unit 100 or a turn-on operation from the user is received.

It should be appreciated here that, in the above solution, the photoelectric sensing unit 200 may be turned off in a case that the first turn-off instruction is received, and the photoelectric sensing unit 200 may be automatically turned on or off in a case that the first turn-on instruction is received. An operable switch or a touchable display screen may be further arranged on the photoelectric sensing unit 200, and the photoelectric sensing unit 200 is turned on or off through a turn-on or turn-off operation performed by the user on the operable switch or the touchable display screen.

Based on the above scheme, indicators in two colors may be arranged on the photoelectric sensing unit 200, so as to indicate different operation states of the photoelectric sensing unit 200 through different color indicators. It should be appreciated that light emitted by the first color indicator 410 and the second color indicator 420 may have different colors, and the specific colors are not particularly defined. For example, the first color indicator 410 may be a light-emitting diode capable of emitting green light, and the second color indicator 420 may be a light-emitting diode capable of emitting white light. In this way, the instruction control unit 300 autonomously sends a turn-on instruction to the voice interaction unit 100, the voice interaction unit 100 starts to receive the voice instruction, sends audio data to the instruction control unit 300, and sends a turn-on instruction to the photoelectric sensing unit 200, the second color indicator 420 of the photoelectric sensing unit 200 is deenergized, and the first color indicator 410 is energized. In a case that the voice interaction unit 100 receives the turn-off instruction, the second color indicator 420 is energized, and the first color indicator 410 is deenergized.

In the above-mentioned solution, in a case that the photoelectric sensing unit 200 is not in operation, the second color indicator is energized. In this way, in an outdoor application scenario, the second color indicator is in an energized state, so as to enable a consumer to find a location and perform an operation. The user turns on the photoelectric sensing unit 200 through the limb instruction by such limb actions as waving a hand, the photoelectric sensing unit 200 receives information, the first color indicator 410 is energized, and the second color indicator 420 is deenergized, which indicates that the photoelectric sensing unit 200 is in an operation state, and wakes up the voice interaction unit for recording.

In some embodiments of the present disclosure, the voice interaction system further includes an image acquisition unit 400, the instruction control unit 300 is connected to the image acquisition unit 400, and further configured to receive and identify image data collected by the image acquisition unit 400, and send, in a case that the image data includes a target gesture, a first turn-on instruction to the voice interaction unit 100. The voice interaction unit 100 is further configured to send, in a case that the first turn-on instruction is received, a second turn-on instruction to the photoelectric sensing unit 200.

The voice interaction system in the embodiments of the present disclosure is described in more detail below.

In the voice interaction system of the embodiments of the present disclosure, the voice interaction unit 100 may include a microphone module (MIC) and the like. The voice interaction unit 100 has different requirements on sound quality according to different application environments, so different types of Complementary Metal Oxide Semiconductor (COMS) silicon microphones may be used, and microphone modules having different numbers of COMS silicon microphones may be designed. The microphone module is taken as an example, it may collect and identify the target voice instruction of the user in the following manner. The microphone module is turned on, so as to record and form an audio file, and send the audio file to the instruction control unit 300.

The instruction control unit 300 may be a computer, an MCU (micro control unit), etc. For example, the instruction control unit 300 may be a host computer (PC terminal) of a smart device.

In the voice interaction system of the embodiments of the present disclosure, the voice interaction unit 100 is communicated with the instruction control unit 300 through serial port instructions, and the voice interaction unit 100 is communicated with the instruction control unit 300 through serial port instructions.

The specific structures of the voice interaction unit 100, the photoelectric sensing unit 200 and the instruction control unit 300 will be further described later, and the voice interaction implementation process of the voice interaction system will be explained in more detail below.

As shown in FIG. 2, the voice interaction method of the voice interaction system of the smart device in the embodiments of the present disclosure may include the following procedures.

1) The user turns on the voice interaction unit 100 voluntarily (the user may directly perform an operation of turning on the voice interaction unit on the voice interaction unit 100, or the user turns on the voice interaction unit 100 through limb instructions such as waving a hand), the instruction control unit 300 receives the target voice instruction sent by the voice interaction unit 100, and control the smart device to perform an action corresponding to the target voice instruction in accordance with the target voice instruction of the user received and identified by the voice interaction unit, so as to realize the voice interaction. The above-mentioned procedure is shown as B→C in the logic block diagram. For example, a case where the smart device is a smart refrigerator, and the voice interaction unit 100 is a microphone is taken as an example, when the microphone is turned on through waving or direct operation of the user, the user speaks a corresponding voice instruction, and the smart refrigerator performs a corresponding action in accordance with the voice instruction. For example, when the user says "Please give me a coca cola", the instruction control unit 300 inside a door of the smart refrigerator sends a specified product to an outlet according to a specified demand of the user, so that the user may take the specified product.

2) The instruction control unit 300 determines, in a case that the voice interaction unit 100 is an on state, whether the voice interaction unit 100 receives a voice instruction within a predetermined time, sends, if not, a standby instruction to the voice interaction unit 100, and sends, in a case that the voice interaction unit 100 does not receive a voice instruction within a predetermined standby time, a turn-off instruction to the voice interaction unit 100.

Specifically, for example, in a case that the instruction control unit 300 detects that the voice interaction unit 100 has not collected voice within the predetermined standby time according to an algorithm, the instruction control unit 300 sends the voice interaction unit 100 a turn-off instruction (denoted by ②, the voice interaction unit 100 stops recording and does not send a voice instruction to the instruction control unit 300 (denoted by ③). At the same time, the voice interaction unit 100 sends a turn-off instruction to the photoelectric sensing unit 200 (denoted by ④, the photoelectric sensing unit 200 is turned off, the second color indicator 420 is deenergized, and the first color indicator 410 is energized. Since the voice interaction unit 100 does not receive a voice instruction, it first waits for a certain period of time, and in a case that the voice instruction is not received within the predetermined standby time, the voice interaction unit 100 is controlled to be turned off, so as to prevent valid voice from being missed. Due to a certain standby time, the voice interaction unit 100 may be turned off after the standby time ends, so as to protect user privacy.

3) In a case that the voice interaction unit 100 is in an off state, the photoelectric sensing unit 200 sends an instruction to the voice interaction unit 100 to control the voice interaction unit 100 to be turned on in a case that the target limb instruction of the user is sensed by the photoelectric sensing unit 200. The instruction control unit 300 receives the target voice instruction sent by the voice interaction unit 100, and controls the smart device to perform an action corresponding to the target voice instruction in accordance with the target voice instruction of the user received and identified by the voice interaction unit 100, so as to realize the voice interaction.

For example, when the user is close to the photoelectric sensing unit 200 (that is, a distance between the user and the photoelectric sensing unit 200 is less than a predetermined distance) or the user makes a target limb action (e.g., waves a hand) in front of the sensor of the photoelectric sensing unit 200, the photoelectric sensing unit 200 sends a turn-on instruction to the voice interaction unit 100, the voice interaction unit 100 starts recording, and sends recording data to the instruction control unit 300, the instruction control unit 300 identifies a text according to a recorded audio, and performs corresponding actions according to the user's voice. The above-mentioned procedure is shown as A→B→C in the logic block diagram.

4) The instruction control unit 300 may autonomously send the first turn-on instruction (denoted by Y) to the voice interaction unit 100, the voice interaction unit 100 is turned on, sends the received audio data including the target voice instruction to the instruction control unit 300 (denoted by Z), and sends a second turn-on instruction to the photoelectric sensing unit 200, and the photoelectric sensing unit 200 is turned on.

For example, a case where the smart device is a smart refrigerator is taken as an example, the voice interaction system further includes an image acquisition unit 400, in a case that the distance between the user and the photoelectric sensing unit 200 is large and exceeds a threshold, or a sensitivity of the photoelectric sensing unit 200 is decreased because the photoelectric sensing unit 200 is disturbed, it may not be possible to turn on the photoelectric sensing unit 200 and the voice interaction unit 100 through limb actions. Then, the instruction control unit 300 may, based on an image collected by the image acquisition unit 400, e.g., when the collected image includes the target gesture, determine that the user has an intention to turn on the voice interaction unit 100, and sends the first turn-on instruction (denoted by V) to the voice interaction unit 100. At the same time, the voice interaction unit 100 sends the second turn-on instruction to the photoelectric sensing unit 200, to turn on the voice interaction unit 100 and the photoelectric sensing unit 200.

Figure 3:
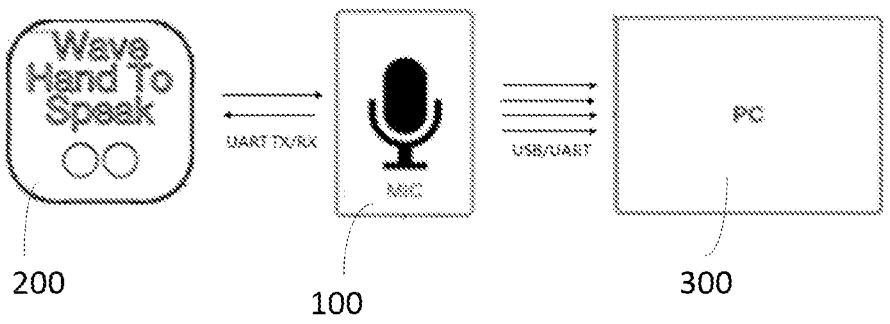
FIG. 3 is a schematic view showing a communication method among an instruction control unit, a voice interaction unit and a photoelectric sensing unit.

FIG. 3 is a schematic view showing a communication method among the instruction control unit 300, the voice interaction unit 100 and the photoelectric sensing unit 200. A case where the instruction control unit 300 is the host computer (PC) of the smart device, the voice interaction unit 100 includes the microphone module (MIC), and the photoelectric sensing unit 200 includes a photoelectric sensing unit, a first indicator and a second indicator is taken as a specific embodiment, a specific operation procedure among the instruction control unit 300, the voice interaction unit 100 and the photoelectric sensing unit 200 is described as follows.

1) As shown in FIG. 3, the photoelectric sensing unit 200 is connected to the voice interaction unit 100, and the voice interaction unit 100 is connected to the instruction control unit 300. The voice interaction system is powered, the voice interaction unit 100 defaults to be in a mute-on state, and the voice interaction system maintains in the standby state, at this time, no voice instruction is sent to the instruction control unit. The voice interaction unit 100 sends its current mute-on state to the photoelectric sensing unit 200, the first color indicator 410 of the photoelectric sensing unit 200 is deenergized, and the second color indicator 420 is energized.

2) In a case that the standby time exceeds a predetermined standby time and the instruction control unit 300 does not detect a valid voice instruction, the instruction control unit 300 sends a first turn-off instruction (i.e., a mute-on instruction) to the voice interaction unit 100 through UART (Universal Asynchronous Receiver/Transmitter), the voice interaction unit 100 is turned off while sending a second turn-off instruction to the photoelectric sensing unit 200 through a serial port, and the photoelectric sensing unit 200 is turned off while the first color indicator 410 is deenergized, the second color indicator 420 is energized.

3) In a case that the instruction control unit 300 sends a turn-on instruction (i.e., a mute-off instruction) to the voice interaction unit 100 through UART, the voice interaction unit 100 is turned on and sends the first turn-on instruction to the photoelectric sensing unit 200 through the serial port, to control the photoelectric sensing unit 200 to be turned on, at this time, the first color indicator 410 is energized, and the second color indicator 420 is deenergized.

It should be appreciated that the photoelectric sensing unit 200 only receives the user's limb instructions in a case that the voice interaction unit 100 is in the mute-on state, at this time, the first color indicator 410 is deenergized, and the second color indicator 420 is energized. In a case that the voice interaction unit 100 is in the mute-off state, it is not able for the photoelectric sensing unit 200 to receive the user's limb instructions, at this time, the first color indicator 410 is energized, and the second color indicator 420 is deenergized.

Specifically, control instructions in the voice interaction system are as shown in Table 1.

TABLE 1

| control instructions for instruction control unit-voice interaction unit-photoelectric sensing unit | | | |
|---|---|---|---|
| control instructions between the voice interaction unit and the photoelectric sensing unit | | | |
| Function | control instructions sent by photoelectric sensing unit to voice interaction unit | instructions returned by voice control unit to photoelectric sensing unit | indicator working status |
| voice interaction system is powered | AT + 10 | voice control unit returns the current mute-on state to photoelectric sensing unit (voice control unit defaults to be in the mute-on state when powered) | second color indicator is energized, and first color indicator is deenergized |

TABLE 1-continued

| control instructions for instruction control unit-voice interaction unit-photoelectric sensing unit | | | |
|---|---|---|---|
| voice interaction unit is in the mute-on state | AT + 11 | AT + 00: indicating mute-off state | second color indicator is energized, and first color indicator is deenergized |
| voice interaction unit is in the mute-off state | AT + 12: mute-off instruction | AT + 01: indicating recording state | first color indicator is energized, and second color indicator is deenergized |

| control instructions between the voice interaction unit and the instruction control unit | | |
|---|---|---|
| Function | instruction control unit sends instructions to voice interaction unit | voice interaction unit returns instructions to the instruction control unit |
| voice interaction unit is in a MUTE ON state | AT + 20: mute-on instruction | AT + 00: indicating mute-on state |
| voice interaction unit is in a MUTE OFF state | AT + 21: mute-off instruction | AT + 01: indicating recording state |
| voice interaction unit status inquiry | AT + 22 | instructions for the voice interaction unit returning the current state thereof |

AT+10, AT+11 and AT+12 in Table 1 are the instructions sent by the photoelectric sensing unit to the voice interaction unit, AT+10 represents the instructions that the photoelectric sensing unit sends its current standby state to the voice interaction unit, AT+11 represents that the photoelectric sensing unit sends the second turn-off instruction (mute-on instruction) to the voice interaction unit, and AT+12 represents that the photoelectric sensing unit sends the first turn-on instruction (i.e., the mute-off instruction) to the voice interaction unit.

AT+00 and AT+01 are instructions that the voice interaction unit returns its current state to the photoelectric sensing unit, where AT+00 represents an instruction that the voice interaction unit is in the mute-on state, and AT+01 represents an instruction that the voice interaction unit is in the recording state.

AT+20, AT+21 and AT+22 are the instructions sent by the instruction control unit to the voice interaction unit, where AT+20 represents an instruction that the instruction control unit controls the voice interaction unit to be in the mute-on state, namely, the first turn-off instruction, AT+21 represents an instruction that the instruction control unit controls the voice interaction unit to be in the mute-off state, namely, the first turn-on instruction, and AT+22 represents an instruction to query the current state of the voice interaction unit sent by the instruction control unit to the voice interaction unit.

AT+00 and AT+01 are instructions that the voice interaction unit returns to the instruction control unit, where AT+00 represents an instruction that the voice interaction unit is in the mute-on state, and AT+01 represents an instruction that the voice interaction unit is in the recording state.

The foregoing is a description of the logical design of the voice interaction system for the smart device in the embodiments of the present disclosure, and the structure of each unit in the voice interaction system for smart device in the embodiments of the present disclosure will be described in detail below.

Figure 4:
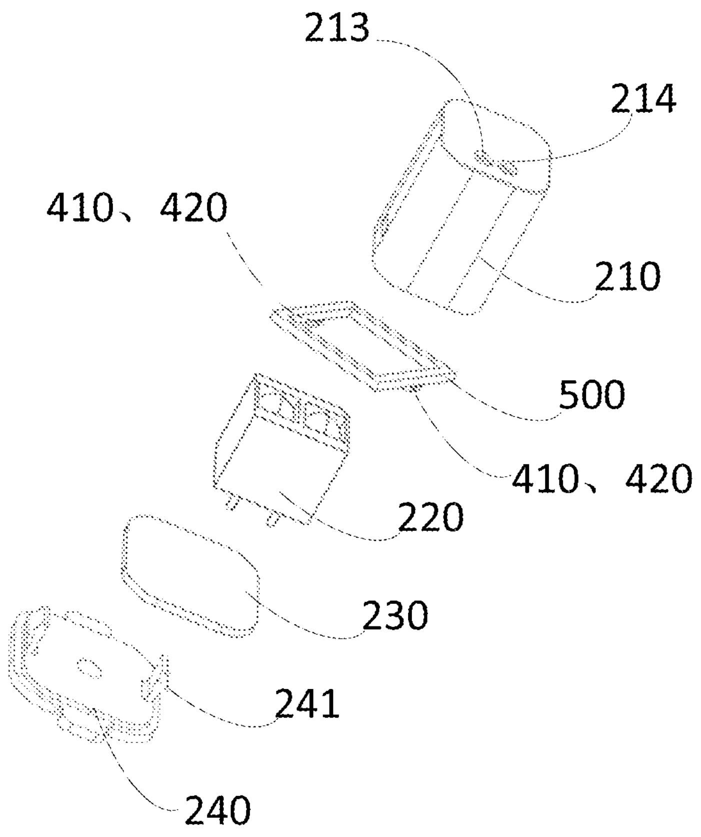
FIG. 4 is a schematic view showing the photoelectric sensing unit according to one embodiment of the present disclosure.
Figure 5:
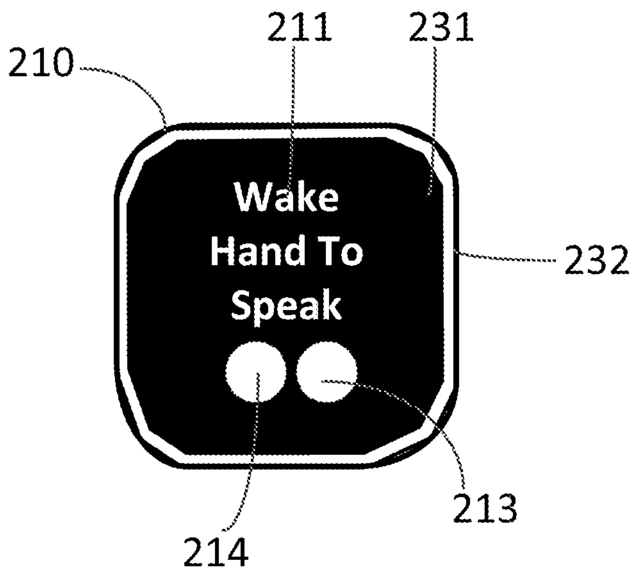
FIG. 5 is a schematic view showing a front end of a housing of the photoelectric sensing unit according to one embodiment of the present disclosure.

In some embodiments of the present disclosure, as shown in FIG. 4 and FIG. 5, the photoelectric sensing unit 200 includes: a housing 210, a photoelectric sensor 220, a circuit board 230, one or more indicators, a rear cover 240 and a first signal transmission harness (not shown). An interior of the housing 210 is hollowed-out, the housing 210 includes a front end and a rear end, an indication mark 211 is provided on an end surface of the front end, and an opening is provided at the rear end. The photoelectric sensor 220 and a light source are arranged in the housing 210. The circuit board 230 is arranged in the housing 210, and a switch circuit is arranged on the circuit board 230 and connected to the photoelectric sensor 220. The rear cover 240 is fastened onto the rear end of the housing 210. One end of the first signal transmission harness is connected to the circuit board 230, and the other end of the signal transmission harness extends out of the rear cover 240. The photoelectric sensing unit further includes the indicators in the housing 210. The indicators are used for indicating a current on or off state of the photoelectric sensing unit. For example, the indicators may each be a light-emitting diode. In some specific embodiments of the present disclosure, the indicators may include a first color indicator 410 and a second color indicator 420.

Figure 6:
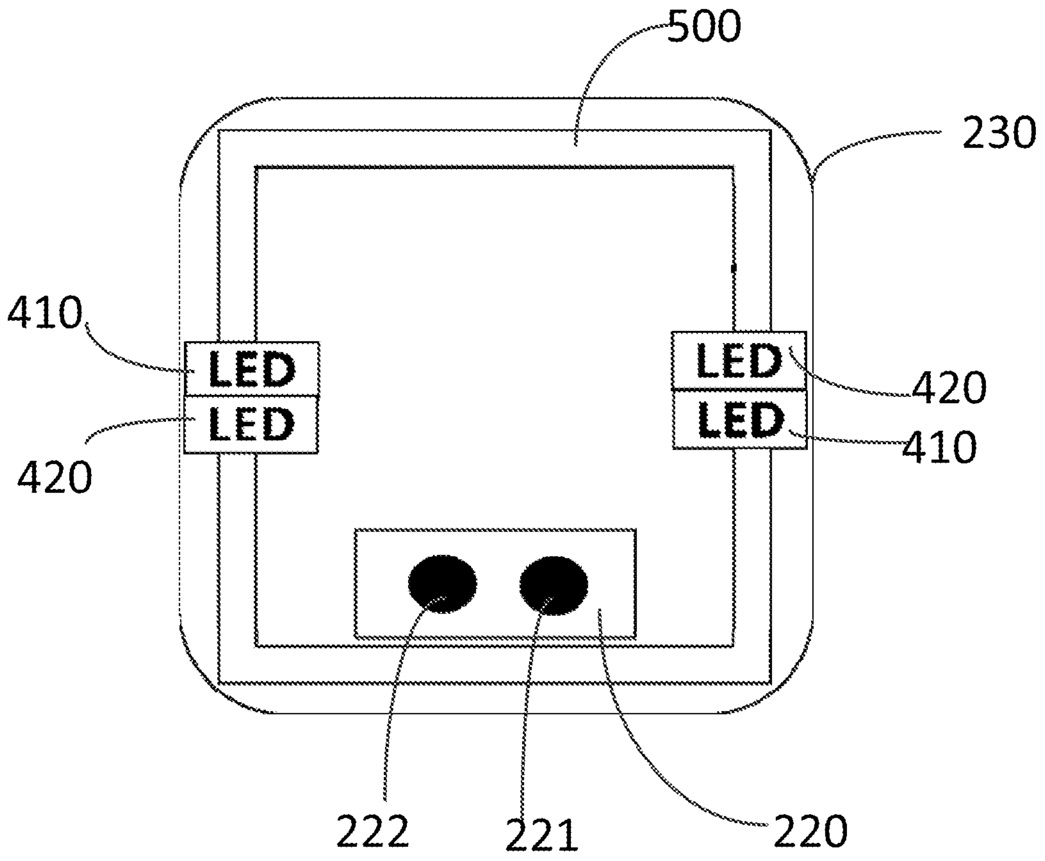
FIG. 6 is a schematic view showing an arrangement position relationship of a light source in the photoelectric sensing unit, a light-guide strip and the photoelectric sensing unit according to one embodiment of the present disclosure.

In some embodiments of the present disclosure, as shown in FIG. 6, the indicators include at least two first color indicators 410 and at least two second color indicators 420, where at least two first color indicators 410 are respectively located on opposite sides of the end surface of the front end, and at least two second color indicators 420 are respectively located on the opposite sides of the end surface of the front end.

Since the first color indicator 410 and the second color indicator 420 are arranged on the opposite sides of the end surface of front end of the housing 210, it is able to improve the brightness display uniformity of the housing. Moreover, the light source is arranged at the periphery of the housing, it is able to avoid a space in the middle region of the circuit board, so as to provide more compact and reasonable spatial layout. It should be appreciated that the number and arrangement positions of the first color indicator 410 and the second color indicator 420 are not limited thereto and will not be particularly defined herein.

In some embodiments of the present disclosure, as shown in FIG. 4, the rear end of the housing 210 is connected to the rear cover 240 in a snap-fit manner. For example, a slot is arranged in the rear end of the housing 210, a buckle 241 is arranged on the rear cover 240, the buckle 241 on the rear cover 240 is fastened into the slot of the housing 210, and the rear cover 240 covers the housing 210, so as to avoid the occurrence of falling off.

In addition, as shown in FIG. 5, a first through hole 213 and a second through hole 214 are arranged in the front end, a receiving electrode 221 and an emitting electrode 222 are arranged on the photoelectric sensor 220, the receiving electrode 221 is located at the first through hole 213, and the emitting electrode 222 is located at the second through hole 214, so as to expose the receiving electrode 221 and the emitting electrode 222 of the photoelectric sensor 220.

In the above solution, a size of the first through hole 213 and the second through hole 214 is designed in such a manner as to expose the receiving electrode and emitting electrode. For example, the first through hole 213 and the second through hole 214 may each has a diameter of 2.8 mm.

In addition, in some embodiments of the present disclosure, the indication mark includes an incised hollowed-out mark. In this way, due to the incised hollowed-out mark on the end surface of the front end of the housing 210, it is able to clearly display a mark on the surface of the housing 210 of photoelectric sensing unit. For example, the mark is a text, such as "Wave Hand To Speak", so as to remind the user to turn on the photoelectric sensing unit through waving, thereby to wake up the microphone for recording.

An embossed design depth of the incised hollowed-out mark on the end surface of the front end of the housing 210 may be about 0.3 mm. As compared with a hollowed-out mark etched in a manner of cameo, it is able to provide a clearer character in the case of the incised hollowed-out mark. A character is thicker in the case of the hollowed-out mark etched in the manner of cameo, when the housing 210 is formed through an injection molding process and the surface thereof is painted, a light transmission performance of the housing 210 is not good, the thicker the character is, the darker a display and the worse a contrast effect. In a case that an incised hollowed-out form is used, the character is thinner, the brighter the display is, the better the contrast effect is, so as to solve the technical problem that the mark of housing 210 is not clearly displayed during the operation of the photoelectric sensing unit.

In addition, in some embodiments of the present disclosure, the end surface of the front end apart from the incised hollowed-out mark 211 is a black silk-screen printing region 231, and the black silk-screen printing region 231 has a blank region 232 at a periphery of the end surface of the front end. In this way, black silk-screen printing is performed around the incised hollowed-out mark, and the brightness display contrast is better, and the blank region 232 may be reserved at the periphery of the end surface of the front end of the housing. A width of the blank region 232 may be about 2 mm, so as to facilitate light transmission at the periphery of the end surface of the front end of the housing 210.

In addition, in some embodiments of the present disclosure, the housing 210 is a transparent injection-molding housing made of a mixed material of an injection-molding material with a light transmittance greater than a predetermined threshold and a masterbatch. For example, the injection-molding material may be an acrylonitrile-butadiene-styrene plastic (ABS plastic).

It should be appreciated that the injection-molding material having a light transmittance greater than the predetermined threshold refers to an injection-molding material having a high light transmittance, and a value of the predetermined threshold is not specifically defined herein. It should be further appreciated that any injection molding material having a good light-transmitting performance may be applied into the present application.

In addition, the mixed material of the injection-molding material and the masterbatch is a known mixed material, which will not be particularly defined herein. When the injection-molding is used to form the housing, the light transmittance and toughness are better, the display screen is uniform, and the assembly is convenient. In some unillustrated embodiments, the housing may also be an injection molding housing having a surface thereof painted, which requires an additional paint-coating process, leading to a relatively high cost.

In addition, in some embodiments of the present disclosure, a light-guide strip 500 is arranged on an inner side of the housing 210 and at a periphery of the end surface of the front end. The light-guide strip 500 may improve the brightness at a periphery of a display region of front end of housing.

The photoelectric sensing unit 200 includes a photoelectric sensor, and the photoelectric sensor is a laser distance sensor. That is, the photoelectric sensing unit 200 may be a laser distance sensing switch, which is a switch device based on laser pulse sensing technology, a principle thereof is to use a principle of laser pulse signal transmission. In a case that a laser pulse signal encounters an obstacle, the intensities of reflections of the laser pulse signal are different at different distances, the detections of obstacle distances are performed according to set sensing distances. The laser sensor is combined with the switch circuit to form a laser sensing distance switch. The photoelectric sensor receives and identifies the user's target limb instruction in the following manner. The user performs some limb actions, e.g., approaches the photoelectric sensing unit or waves and performs other limb actions, within the sensing distance of the photoelectric sensor, and the photoelectric sensing unit identifies the limb action instruction according to the received reflected light signal.

The photoelectric sensing unit 200 may also be an infrared sensing sensor. As compared with the infrared sensing sensor, when the laser distance sensor is used as the photoelectric sensing unit 200, the laser distance sensor may be used in an outdoor natural light environment, so as to solve the problem that the infrared sensing sensor is interfered by infrared light in natural light under sunlight.

In addition, a sensing distance of the laser distance sensor 210 may reach 80 mm to 150 mm. It should be appreciated that the sensing distance of the laser distance sensor is not limited to the above-mentioned range, and may be reasonably adjusted according to practical applications.

As shown in FIG. 6, the laser distance sensor 210 may include two photodiodes including the emitting electrode 222 and the receiving electrode 221, the laser distance sensor 210 determines a range of a power-on current and the sensing distance of the laser sensor through a value of a peripheral resistance on the circuit board 230. In an outdoor usage environment, when using the laser distance sensor, it is able to prevent the sensor from being adversely affected by the natural light at the infrared band. During the operation of the laser sensor, the emitting electrode first emits a laser pulse, when the user performs limb instruction actions (e.g., the user waves his hand within the sensing distance), the emitted laser pulse is reflected back by a blocking obstacle, at this time, the receiving electrode of the laser sensor detects the reflected laser pulse, converts it into an electrical signal, so as to wake up the voice interaction unit 100 in accordance with the UART instruction.

In addition, in a specific exemplary embodiment of the present disclosure, the circuit board 230 includes a first surface and a second surface opposite to each other. The indicators (such as the first color indicator 410 and the second color indicator 420) are arranged on the first surface, and may each be a light-emitting diode. When the indicators are energized, the light may pass through the housing 210, so that the incised hollowed-out mark 211 on the front end of the housing 210 may be displayed. The laser distance sensor 220 and the peripheral resistance, etc. are further arranged on the first surface.

The light-guide strip 500 is arranged on the first surface and surrounds the periphery of the front end of the housing 210 for improving the brightness at the periphery of the display screen.

A photoelectric sensing main chip and the first signal transmission harness are arranged on the second surface, and the photoelectric sensing main chip receives a signal sent by the infrared sensor, processes the signal, and sends the turn-on instruction to the microphone module. One end of the first signal transmission harness is connected to the circuit board 230, and the other end of the signal transmission harness passes through a through hole formed in the center of the rear cover 240, and is connected to the first signal transmission harness of the microphone module. The photoelectric sensing unit receives and sends instructions through the signal transmission harness.

Figure 7:
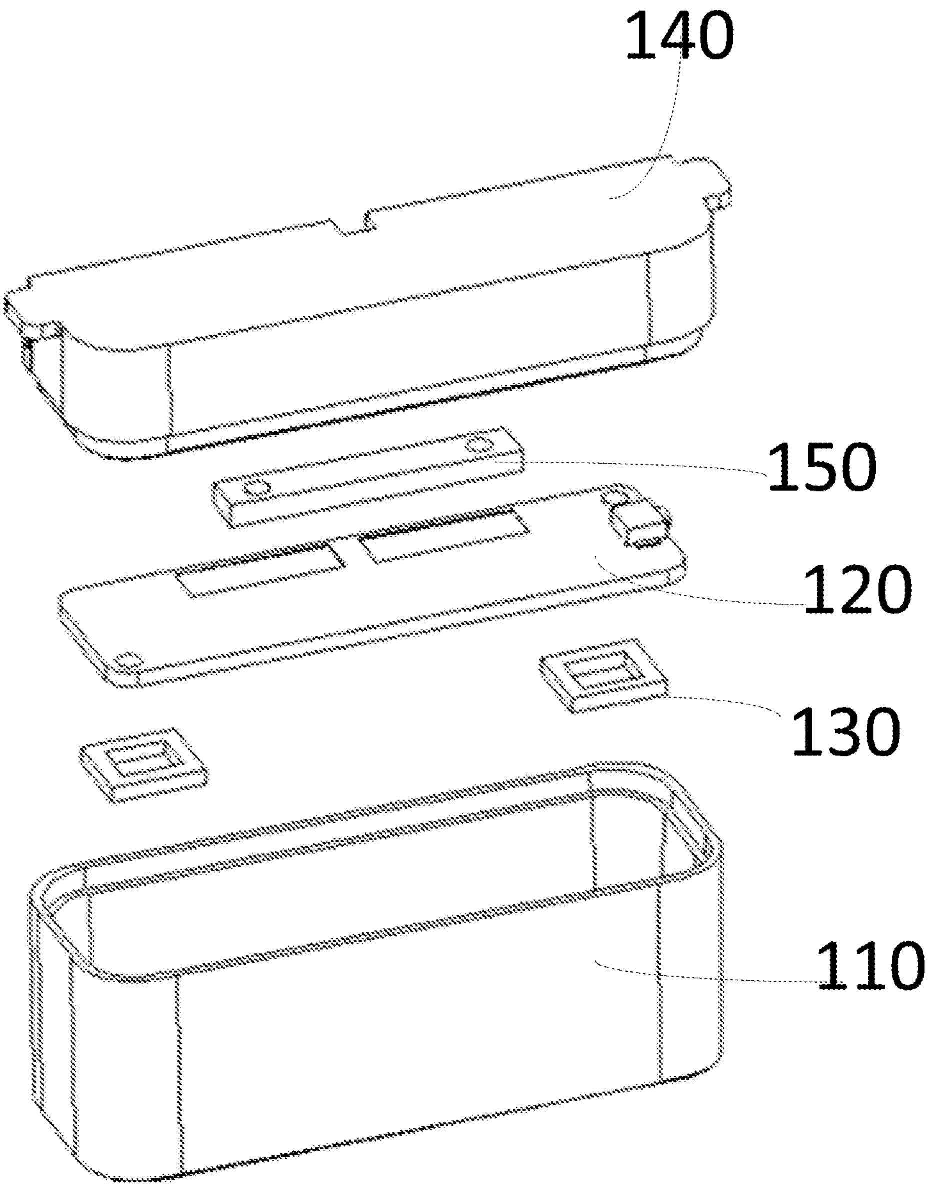
FIG. 7 is an exploded view of a microphone module according to one embodiment of the present disclosure.

In addition, in some embodiments of the present disclosure, the voice interaction unit 100 includes the microphone module. FIG. 7 is an exploded view of the microphone module.

As shown in FIG. 7, the microphone module includes: an upper cover 110, at least two radio microphones (not shown), a printed circuit board 120, a sealing ring 130 and a bottom cover 140, an interior of the upper cover 110 is hollowed-out, the upper cover 110 includes a front end and a rear end, at least two radio holes are arranged at the front end, and an opening is provided at the rear end is open. The at least two radio microphones are arranged inside the upper cover 110, each of the radio microphones corresponds to one radio hole, and one sealing ring 130 is arranged at each of the radio holes. The printed circuit board 120 is arranged inside the upper cover 110 and connected to the radio microphone. The bottom cover 140 is arranged at the rear end of the upper cover 110.

In some embodiments of the present disclosure, the microphone module further includes: a second signal transmission harness connected to the printed circuit board 120, and a wire-clipping plate 150 arranged on the printed circuit board 120 for clipping the second signal transmission harness. The bottom cover 140 and the wire-clipping plate are fastened onto the upper cover 110 in a snap-fit manner, and encapsulated by a sealant.

In an exemplary embodiment of the present disclosure, a black mark (LOGO) is arranged on the upper cover 110 of the microphone module through silk-screen printing, so as to facilitate user identification. The two radio holes corresponding to positions of the sealing rings 130 are arranged on the upper cover 110 from top to bottom, so as to collect sound in a better manner.

In an exemplary embodiment of the present disclosure, the printed circuit board 120 includes a front surface facing the upper cover 110 and a back surface opposite to the front surface. A case where there are two microphones is taken as an example, the two microphones are arranged on opposite ends of the front surface. The case where there are two microphones in the microphone module is taken as an example, when an ambient noise is sampled, a sound waveform is analyzed and a phase-operation is performed on the sound waveform, and then the sound waveform is superimposed on a sampling waveform of a main microphone, to form a phase cancellation, so that one of the microphones stably maintains clear recording, and the other one of the microphones actively eliminates physical noise, thereby to provide a clearer recorded sound with an algorithm processing, and solve the technical problem of poor recording effect of the microphone in a noisy environment. When the two microphones are used to deal with changing and complex sound environments, it is able to improve a signal-to-noise ratio, maintain a pure recording sound, and provide a more accurate post-processing algorithm.

A voice signal main chip is further arranged on the front surface of the printed circuit board 120, and may perform processing such as noise reduction and algorithm optimization in accordance with the sound data recorded by the two microphones. The voice signal main chip includes a serial port interface for sending and receiving instructions from the photoelectric sensing unit 200 and the instruction control unit 300.

A reset key is arranged on the back surface of the printed circuit board 120 for subsequent software upgrade operations.

A connection wire socket is further arranged on the back surface of the printed circuit board 120, and used to maintain signal data transmission through being connected to the second signal transmission harness between the microphone module and the photoelectric sensing unit as well as the PC terminal.

The bottom cover 140 and a wire-clipping cover may be connected to the upper cover 110 in a snap-fit manner, and encapsulated by a sealant, so as to prevent damage from external force.

The present disclosure further provides in some embodiments a voice interaction method, which includes: determining whether the voice interaction unit 100 is in the on state; determining, in a case that the voice interaction unit is in the on state, whether the voice interaction unit 100 receives the target voice instruction within the predetermined time, controlling, in a case that the target voice instruction is received within the predetermined time, a smart device to perform the action corresponding to the target voice instruction in accordance with the target voice instruction of the user received and identified by the voice interaction unit, and sending, in a case that the voice instruction is not received within the predetermined time, the standby instruction to the voice interaction unit 100: and controlling, in a case that the voice interaction unit is not in the on state, in accordance with the target limb instruction of the user received and identified by the photoelectric sensing unit 200, the voice interaction unit 100 to be turned on, and controlling, in accordance with the target voice instruction of the user received and identified by the voice interaction unit 100, the smart device to perform the action corresponding to the target voice instruction.

In some exemplary embodiments of the present disclosure, the method further includes: determining, in a case that the voice interaction unit 100 is in the on state, whether the voice interaction unit 100 receives the voice instruction within a predetermined standby time, and controlling, in a case that the voice interaction unit is not received within the predetermined standby time, the voice interaction unit 100 to be turned off.

In some exemplary embodiments of the present disclosure, the method further includes: determining, in a case that the voice interaction unit 100 is in the on state, whether the voice interaction unit 100 receives the voice instruction within the predetermined time, and controlling, in a case that the voice interaction unit is not received within the predetermined time, the photoelectric sensing unit 200 to be turned off.

In some exemplary embodiments of the present disclosure, the method further includes: energizing a first color indicator 410 in a case that the photoelectric sensing unit 200 receives a second turn-off instruction or a turn-off operation from the user, and energizing a second color indicator 420 in a case that a second turn-on instruction from the voice interaction unit 100 or a turn-on operation from the user is received.

In some exemplary embodiments of the present disclosure, the method further includes: receiving and identifying image data collected by an image acquisition unit 400 in the smart device, and controlling, in a case that the image data includes a target gesture, the photoelectric sensing unit 200 and the voice interaction unit 100 to be turned on.

The specific voice interaction process of the voice interaction method is the same as the specific voice interaction process of the voice interaction system in the present disclosure, and will not be particularly defined herein.

The present disclosure further provides in some embodiments a smart device including the above-mentioned voice interaction system.

The smart device may include a smart refrigerator, a smart washing machine, a smart TV, etc., and the application scenarios of the smart device are not limited to household appliances, but may also be applied to such application scenarios as shopping guides in clothing shopping malls and self-service convenience stores.

Some descriptions will be given as follows.

(1) The drawings merely relate to structures involved in the embodiments of the present disclosure, and the other structures may refer to those known in the art.

(2) For clarification, in the drawings for describing the embodiments of the present disclosure, a thickness of a layer or region is zoomed out or in, i.e., these drawings are not provided in accordance with an actual scale. It should be appreciated that, in the case that such an element as layer, film, region or substrate is arranged "on" or "under" another element, it may be directly arranged "on" or "under" the other element, or an intermediate element may be arranged therebetween.

(3) In the case of no conflict, the embodiments of the present disclosure and the features therein may be combined to acquire new embodiments.

The above embodiments are merely for illustrative purposes, but shall not be construed as limiting the scope of the present disclosure. The scope of the present disclosure shall be subject to the scope defined by the appended claims.

What is claimed is:

1. A voice interaction system, applied to a smart device, comprising:

a voice interaction unit comprising a microphone, configured to collect and identify a target voice instruction of a user;

a photoelectric sensing unit comprising a photoelectric sensor, wherein the photoelectric sensing unit is directly connected to the voice interaction unit, and configured to receive and identify a target limb instruction of the user, and control the voice interaction unit to be turned on in accordance with the target limb instruction in a case that the voice interaction unit is not in an on state, and the photoelectric sensing unit directly transmits instructions to the voice interaction unit; and an instruction controller, wherein the instruction controller is connected to the voice interaction unit, and configured to determine whether the voice interaction unit is in the on state, determine, in a case that the voice interaction unit is in the on state, whether the voice interaction unit receives a target voice instruction within a predetermined time, control, in a case that the target voice instruction is received within the predetermined time, the smart device to perform an action corresponding to the target voice instruction in accordance with the target voice instruction of the user received and identified by the voice interaction unit, and send, in a case that the voice instruction is not received within the predetermined time, a standby instruction to the voice interaction unit, wherein:

the instruction controller is further configured to identify, after sending the standby instruction, whether the voice interaction unit receives the voice instruction within a predetermined standby time, and send, in a case that the voice instruction is not received within the predetermined stand by time, a first turn-off instruction to the voice interaction unit that causes the voice interaction unit to be turned off;

one or more indicators are provided on the photoelectric sensing unit, and the indicators comprise a first color indicator and a second color indicator;

the voice interaction unit is further configured to send, in a case that the first turn-off instruction is received, a second turn-off instruction to the photoelectric sensing unit;

the photoelectric sensing unit is further configured to energize the first color indicator in a case that the second turn-off instruction is received, and energize the second color indicator in a case that a first turn-on instruction or a turn-on operation from the user is received; and the target limb instruction comprises a distance between the user and the photoelectric sensing unit is less than a predetermined distance or a target limb action by the user, and the target limb action comprises waves a hand in front of the photoelectric sensing unit.

2. The voice interaction system according to claim 1, wherein the photoelectric sensor is a laser distance sensor.

3. The voice interaction system according to claim 2, wherein the laser distance sensor has a sensing distance of 80 mm to 150 mm.

4. The voice interaction system according to claim 1, wherein the photoelectric sensing unit comprises:

a housing, wherein an interior of the housing is hollowed-out, the housing comprises a front end and a rear end, an indication mark is provided on an end surface of the front end, and an opening is provided at the rear end;

a photoelectric sensor arranged in the housing; a circuit board arranged in the housing, wherein a switch circuit is arranged on the circuit board and connected to the photoelectric sensor;

an indicator arranged in the housing; a rear cover fastened onto the rear end of the housing; and a signal transmission harness, wherein one end of the signal transmission harness is connected to the circuit board, and the other end of the signal transmission harness extends out of the rear cover.

5. The voice interaction system according to claim 4, wherein the indication mark comprises an incised hollowed-out mark, and the end surface of the frontend apart from the incised hollowed-out mark is a black silk-screen printing region, and the black silk-screen printing region has a blank region at a periphery of the end surface of the front end.

6. The voice interaction system according to claim 4, wherein the housing is a transparent injection-molding housing made of a mixed material of an injection-molding material with a light transmittance greater than a predetermined threshold and a masterbatch.

7. The voice interaction system according to claim 6, wherein the injection-molding material is an acrylonitrile-butadiene-styrene plastic.

8. The voice interaction system according to claim 1, wherein a light-guide strip is arranged on an inner side of the housing and at a periphery of the end surface of the front end.

9. The voice interaction system according to claim 8, wherein the indicators comprise at least two first color indicators and at least two second color indicators, wherein the at least two first color indicators are respectively located on opposite sides of the end surface of the front end, and the at least two second color indicators are respectively located on the opposite sides of the end surface of the front end.

10. The voice interaction system according to claim 1, wherein the voice interaction system further comprises an image acquisitor the instruction controller is connected to the image acquisitor, and configured to receive and identify image data collected by the image acquisitor, and send, in a case that the image data comprises a target gesture, a first turn-on instruction to the voice interaction unit; and the voice interaction unit is further configured to send, in a case that the first turn-on instruction is received, a second turn-on instruction to the photoelectric sensing unit.

11. The voice interaction system according to claim 1, wherein a first through hole and a second through hole are arranged in the frontend, a receiving electrode and an emitting electrode are arranged on the photoelectric sensor, the receiving electrode is located at the first through hole, and the emitting electrode is located at the second through hole.

12. The voice interaction system according to claim 1, wherein the voice interaction unit is communicated with the instruction controller through serial port instructions, and the voice interaction unit is communicated with the photoelectric sensing unit through serial port instructions.

13. A smart device, comprising the voice interaction system according to claim 1.

14. A voice interaction method for a voice interaction system comprising:

determining whether the voice interaction unit is in an on state;

determining, in a case that the voice interaction unit is in the on state, whether the voice interaction unit receives a target voice instruction within a predetermined time, controlling, in a case that the target voice instruction is received within the predetermined time, a smart device to perform an action corresponding to the target voice instruction in accordance with the target voice instruction of a user received and identified by the voice interaction unit, and sending, in a case that the voice instruction is not received within the predetermined time, a standby instruction to the voice interaction unit;

controlling, in a case that the voice interaction unit is not in the on state, in accordance with a target limb instruction of the user received and identified by a photoelectric sensing unit, the voice interaction unit to be turned on, and controlling, in accordance with the target voice instruction of the user received and identified by the voice interaction unit, the smart device to perform the action corresponding to the target voice instruction;

determining, after sending the standby instruction, whether the voice interaction unit receives the voice instruction within a predetermined standby time, and sending, in a case that the voice interaction unit is not received within the predetermined standby time, a first turn-off instruction to the voice interaction unit that causes the voice interaction unit to be turned off, wherein:

one or more indicators are provided on the photoelectric sensing unit, and the indicators comprise a first color indicator and a second color indicator;

the voice interaction unit is further configured to send, in a case that the first turn-off instruction is received, a second turn-off instruction to the photoelectric sensing unit;

the photoelectric sensing unit is configured to energize the first color indicator in a case that the second turn-off instruction is received, and energize the second color indicator in a case that a first turn-on instruction or a turn-on operation from the user is received; and the target limb instruction comprises a distance between the user and the photoelectric sensing unit is less than a predetermined distance or a target limb action by the user, and the target limb action comprises waves a hand in front of the photoelectric sensing unit.

15. The voice interaction method according to claim 14, wherein the method further comprises: determining, in a case that the voice interaction unit is in the on state, whether the voice interaction unit receives the voice instruction within the predetermined time; controlling, in a case that the voice interaction unit is not received within the predetermined time, the photoelectric sensing unit to be turned off.

16. The voice interaction method according to claim 14, wherein the method further comprises:

receiving and identifying image data collected by an image acquisition unit; and controlling, in a case that the image data comprises a target gesture, the photoelectric sensing unit and the voice interaction unit to be turned on.

* * * * *